May 4, 1948.    P. G. HANSEL    2,440,682
RADIO DIRECTION FINDER
Filed March 3, 1945
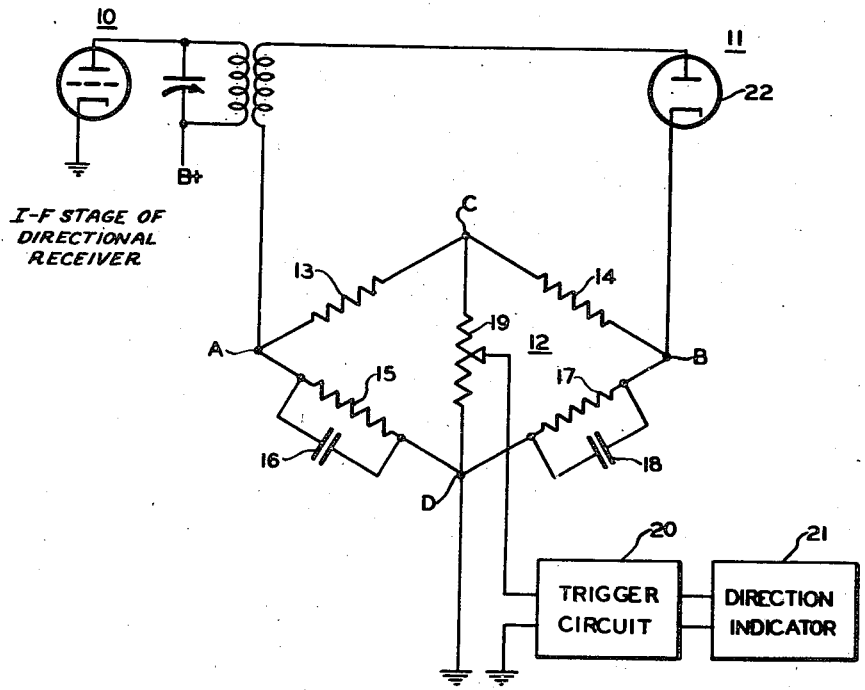
INVENTOR.
PAUL G. HANSEL
BY
ATTORNEY Patented May 4, 1948

2,440,682

UNITED STATES PATENT OFFICE 2,440,682

RADIO DIRECTION FINDER

Paul G. Hansel, Red Bank, N. J.

Application March 3, 1945, Serial No. 580,791

8 Claims. (Cl. 343—113).

(Granted under the act of March 3, 1883, as amended April 30, 1928; 370 O. G. 757)

The invention described herein may be manufactured and used by or for the Government for governmental purposes, without the payment to me of any royalty thereon.

This invention relates to direction finders and more particularly to a system by which the accuracy of direction finding on sources of wave energy is increased.

The invention is particularly directed to reduction of errors experienced in short-wave radio direction finding on fading signals.

The usual practice in short-wave direction finding is to observe many "snap-shot" bearings over a period of minutes and then to attempt to discard the "low-grade" observations and average the remaining "high-grade" observations.

Such a practice is time-consuming and is subject to variable human errors because of the difficulties involved in obtaining a reliable subjective discrimination between "high grade" and "low-grade" observations.

A statistical analysis of thousands of directional observations on fading signals has shown that a reliable discrimination between "high-grade" bearings and "low grade" bearings can be made on the basis of amplitudes.

There is a strong statistical probability that the bearings observed near the amplitude crest of the fading cycle will be of "high-grade" and that the bearings observed near the trough of the fading cycle will be of "low-grade."

The instrumental and propagational factors which account for the large errors obtained near the trough of the fading cycle are both numerous and extremely complex and it is believed that this invention can be adequately explained by referring only to the most well known, i. e., "polarization effects."

Almost all radio direction finders are designed to be responsive to plane-polarized waves. For example, all direction finders employing spaced vertical aerials will abstract the greatest amount of "wanted" or useful energy when the received wave is plane-polarized with the electric vector vertical. In practice, however, a received sky wave is usually either elliptically polarized or, if plane polarized, has a varying orientation of the plane of polarization. It is quite common for the plane of polarization to rotate from vertical to horizontal in a few seconds, thus producing periodically the so-called "polarization fading." As the plane of polarization rotates from vertical to horizontal the signal received by the vertical aerials decreases. When the plane of polarization is horizontal no "wanted" or primary energy at all is received from the incident wave. However, the ground and other conductors near the direction finders abstract energy from horizontally-polarized waves and reradiate secondary fields with vertically-polarized components. These vertically-polarized secondary fields are relatively weak but they produce very large errors when no primary energy is received. The apparent bearing indicated by the direction finder will be of "highest grade" when the wave is vertically-polarized because under these conditions the vertical aerials receive more energy from the strong primary field than from the weak secondary field. It is apparent that bearings taken on signals subject to "polarization fading" will be more accurate if observed near the crest of the fading cycle. In those cases where complex multi-path interference and diversity effects produce severe fading it can also be shown from statistical considerations that bearings are of "high grade" when observed near the crest of the fading cycle.

One of the objects of the present invention is to provide a method for enhancing the accuracy of direction finding on signals which are fluctuating rapidly in usable signal strength and in apparent direction.

Another object of this invention is to provide equipment for discriminating automatically between favorable and unfavorable times for observing the bearing on a source of wave energy.

Other objects of my invention will appear in the following detailed description thereof, it being understood that the above general statements of the objects of my invention are intended to explain but not to limit by invention in any manner.

Referring to the drawing, the single figure is a schematic view of an electrical circuit in one embodiment of the instant invention.

In the particular embodiment shown in the drawing the invention is applied to the detector stage of an ordinary super-heterodyne receiver in direction finding equipment, although it may be applied to the detector stage of any type of receiver.

A received signal, after passing through the last intermediate frequency (I. F.) stage 10, is then impressed on the plate of the diode type tube 22 in the detector stage 11.

The diode detector stage 11 is provided with a bridge circuit, said bridge circuit 12 comprising two upper resistive arms 13 and 14 of equal resistance and the two lower arms of said bridge circuit comprise a resistor-capacitor (R. C.) combination one arm having a resistor 15 and a capacitor 16, the other resistor 17 and a capacitor 18. To the input junction A, B of the said bridge circuit is applied the energy of the detector stage 11. Across the output junctions, C, D, is inserted a variable resistor 19.

The time constant of the R. C. combination 15, 16 is prearranged to be much longer than that of the other R. C. combination 17, 18, whereby the negative voltage developed across the R. C. combination 15, 16 will be substantially proportional to the average value of signal strength and the positive voltage across the R. C. combination 17, 18 will be substantially proportional to the instantaneous value of the signal strength. Thus, voltage across the resistor 19 is proportional to the difference between the instantaneous and the average values of signal strength. An average value, therefore, of the R. C. combination 15, 16 may be 1 to 5 seconds while that of the R. C. combination 17, 18 may be of the order of 1/50 to 1/10 of a second.

The voltage across the resistor 19 is employed to actuate a trigger circuit 20. The trigger circuit mentioned may be of the usual type wherein an output is produced only when the input attains a specific threshold value. Thus it may be an amplifier stage with negative bias adjustment for achieving the desired trigger action when the positive voltage output across the resistor 19 exceeds this negative bias. In turn the trigger circuit 20 may be used to actuate an indicator circuit 21. For example, the indicator 21 may be a cathode-ray (C. R.) tube wherein the electron stream is controlled by applying a negative bias to the intensity control grid of said C. R. tube. The trigger circuit 20 would then make the indicator circuit operative by overcoming said negative bias on the said intensity control grid.

The relation of signal strength which must exist between the instantaneous and average values before the trigger circuit 20 is actuated is adjusted by means of the threshold control 19 which may take the form of an ordinary potentiometer.

In the operation of this circuit the threshold control 19 is adjusted so the indicator 21 operates when the instantaneous signal strength equals or exceeds the average value. Under these conditions, a bearing indication is produced on steady value signals at all times and on fading signals only during the part of the fading cycle most favorable for direction finding.

While I have shown a preferred embodiment of my invention, it will be obvious that numerous changes and additions may be made without departing from its spirit.

What I claim is:

1. A direction finding system for radio signals undergoing a fading cycle comprising: a direction finding receiver, means to average the signal strengths of said fading signal over a period of time which includes variations of signal strengths in said fading signal, means to isolate shorter period components of said fading signals, means to combine said average signal strengths with said isolated short period components, a direction indicator, and means to feed said combined signals into said direction indicator only when said combined signals reach a predetermined threshold value of amplitude.

2. A direction finding system according to claim 1 wherein said signal strength averaging means and said shorter period components isolating means, each comprises time constant circuits, said signal strength averaging means time constant circuit being longer than said shorter period components isolating means time constant circuit.

3. A direction finding system according to claim 1 wherein said signal strength averaging means and said shorter period components isolating means produce outputs of mutually opposing polarity and wherein said means to feed said combined signals into said direction indicator is operative when said combined signals reach a predetermined amplitude and polarity.

4. A direction finding system comprising: a direction finding receiver having a demodulator stage, a first load circuit in said demodulator stage, means in said first load circuit to average the signal strengths of a fading signal over a period of time which includes variations of signal strengths in said fading signal, a second load circuit, means in said second load circuit to isolate components of said fading signals, each of said components covering a shorter period than said period of time, covered by said first load circuit, means to combine the outputs of both said load circuits, a direction indicator, and means to feed said combined signals into said direction indicator only when said combined signals reach a predetermined threshold value of amplitude.

5. A direction finding system according to claim 4 wherein each of said load circuits comprise time constant circuits and wherein the time constant of said first load circuit is longer than the time constant of said second load circuit.

6. A direction finding system according to claim 4 wherein the outputs of both said load circuits are of mutually opposing polarity and wherein said means to feed said combined signals into said direction indicator comprises a trigger circuit, said trigger circuit being actuated when said combined signals reach a predetermined threshold value of amplitude and polarity.

7. A direction finding system for radio signals comprising a direction finding receiver having a demodulator stage, a first resistor-condenser time constant load circuit in said demodulator stage, a second resistor-condenser time constant load circuit in said demodulator stage, the time constant of said first load circuit being longer than the time constant of said second load circuit whereby a greater proportion of a fading signal is averaged in said first load circuit than in said second load circuit, said first and second load circuits being interconnected to mutually produce outputs of opposite polarity, means to combine said outputs, a trigger circuit operative when the combined outputs of said first and second load stages reach a predetermined threshold value of amplitude and polarity, and a direction indicator, said trigger circuit operating said direction indicator when said predetermined threshold value of amplitude and polarity is applied to said trigger circuit.

8. The method of determining the direction of propagation of radio signals during fading conditions, which comprises the steps of receiving and detecting said signals, separating from the detected signals the instantaneous and average components thereof, combining said components in opposition to derive resultant signals, and indicating only resultant signals above a predetermined amplitude.

PAUL G. HANSEL.

REFERENCES CITED

The following references are of record in the file of this patent:

UNITED STATES PATENTS

| Number | Name | Date |
|---|---|---|
| 1,968,068 | Blancard et al. | July 31, 1934 |
| 2,078,058 | Chireix | Apr. 20, 1937 |
| 2,226,020 | Hefele | Dec. 31, 1940 |
| 2,270,773 | Sonnentag et al. | Jan. 20, 1942 |
| 2,272,849 | Perkins | Feb. 10, 1942 |
| 2,417,310 | Luck | Mar. 11, 1947 |
| 2,422,122 | Norton | June 10, 1947 |